United States Patent [19]

Hayashi et al.

[11] Patent Number: 5,108,676
[45] Date of Patent: Apr. 28, 1992

[54] METHOD OF FORMING A PLASTIC PLATE

[75] Inventors: Tatsuya Hayashi; Takao Yamagishi, both of Hiratsuka, Japan

[73] Assignee: Mitsubishi Plastics Industries Limited, Tokyo, Japan

[21] Appl. No.: 682,976

[22] Filed: Apr. 10, 1991

[30] Foreign Application Priority Data

Apr. 17, 1990 [JP] Japan .................. 2-100757
Nov. 29, 1990 [JP] Japan .................. 2-333262

[51] Int. Cl.[5] ........................ B29C 47/06
[52] U.S. Cl. ....................... 264/108; 264/171; 425/131.1; 425/133.5; 425/462
[58] Field of Search ............. 264/171, 75, 176.1, 264/108, 211.24, 211.12; 425/131.1, 461, 462, 467, 382.4, 133.5

[56] References Cited

U.S. PATENT DOCUMENTS

| | | | |
|---|---|---|---|
| 3,308,222 | 3/1967 | Kovacs | 264/176.1 |
| 3,320,636 | 5/1967 | Corbett | 425/133.5 |
| 3,551,545 | 12/1970 | Overdiep | 264/211.12 |
| 3,592,882 | 7/1971 | Mortia | 264/108 |
| 3,918,867 | 11/1975 | Beyer | 264/108 |
| 4,426,344 | 1/1984 | Dinter et al. | 425/462 |
| 4,880,370 | 11/1989 | Krumm | 425/133.5 |
| 4,927,675 | 5/1990 | Adams et al. | 264/171 |

FOREIGN PATENT DOCUMENTS

| | | |
|---|---|---|
| 0225500 | of 1987 | European Pat. Off. . |
| 0315304 | 10/1989 | European Pat. Off. . |
| 3517779 | 11/1986 | Fed. Rep. of Germany ........ 264/75 |
| 3801574 | 8/1989 | Fed. Rep. of Germany ...... 425/461 |
| 212693 | 8/1984 | German Democratic Rep. ... 264/75 |
| 2-16005 | 1/1990 | Japan .................. 264/108 |

Primary Examiner—Jeffery Thurlow
Attorney, Agent, or Firm—Oblon, Spivak, McClelland, Maier & Neustadt

[57] ABSTRACT

A method of forming a plastic plate includes melt extruding a thermoplastic resin containing a flake-like inorganic filler with an extruder into a former while a back pressure is applied to the extruded thermoplastic resin to thereby form it into a plate like body. The molten resin is extruded from at least one extruder into a channel or channels corresponding to the extruders which are formed in an adapter. The molten resin is fed to a cavity having at least one partition plate, formed in the former which is communicatively connected to the adapter so that a molten resin stream or streams introduced from the channel or channels are respectively divided and developed into at least two plate like bodies, and the plate-like bodies are merged in an overlapping state, followed by heat-bonding them.

4 Claims, 3 Drawing Sheets

METHOD OF FORMING A PLASTIC PLATE

BACKGROUND OF THE INVENTION

The present invention relates to a method of forming a plastic plate. More particularly, the present invention relates to a method of forming a shaped product having a high rigidity in which an inorganic filler is oriented in the entire layer of a plate-like body, or an extruded product having layers of different hue and composition wherein a thermoplastic resin containing a flake-like inorganic filler (hereinbelow, referred to as a filler-containing resin) or a thermoplastic resin without containing filler (hereinbelow, referred to as a sole resin) discharged in a molten state from an extruder is formed into a plurality of plate-like bodies under a back pressure in a single former, and then, the platelike bodies are merged into a single body in the former.

DESCRIPTION OF THE RELATED ART

There has been known a method of forming a plate-like body wherein a resin, particularly a resin having crystallizability such as polypropylene, polyamide or the like is melt-extruded into a former while a back pressure is applied to the molten resin to thereby form the resin into a predetermined shape in a former. The plate-like body obtained by this method is a single-layered molded product.

In order to impart rigidity to the plate-like molded product, a method wherein a flaky or fibrous inorganic filler is added to a resin and thus obtained mixture is molded has been generally used.

However, there is a limit to the increasing of the rigidity on the molded product when a large amount of the filler is added to the resin to obtain a high rigidity, and there may occur molding fault.

Further, when it is necessary to form a thick-walled molded product wherein the hue or composition is different between an outer layer portion and the opposite layer portion, or an intermediate layer and the outer layer portions, a method wherein a plurality of single-layered molded products each having different hue and composition are formed by extrusion-molding, and the single-layered molded products are laminated and melt-bonded by a heat roll method or a heat press method, is generally used.

However, the above-mentioned method requires many steps of shaping and is complicated, which reduces processability and requires a great energy consumption. Further, there easily occur color change and denaturation because the heat history of the resin is large and the quality of a molded product is adversely effected.

SUMMARY OF THE INVENTION

It is an object of the present invention to provide a method of forming a plastic plate having a high rigidity.

In accordance with the present invention, there is provided a method of forming a plastic plate comprising melt-extruding a thermoplastic resin containing a flake-like inorganic filler with an extruder into a former while a back pressure is applied to the extruded thermoplastic resin to thereby form it into a plate-like body, said method being characterized by introducing the molten resin extruded from the extruder into a channel formed in an adapter, feeding the molten resin to a cavity having at least one partition plate, formed in the former which is communicatively connected to the adapter so that the molten resin introduced from the channel is divided and developed into at least two plate-like bodies, merging the plate-like bodies in an overlapping state, and heat-bonding the interlayer of the overlapping plate-like bodies.

In accordance with the present invention, there is provided a method of forming a plastic plate comprising melt-extruding a thermoplastic resin with a plurality of extruders into a former while a back pressure is applied to the extruded thermoplastic resin, said method being characterized by comprising communicatively connecting the extruders to a single adapter introducing the molten resin supplied from each of the extruders into channels formed independently in the adapter, feeding the molten resin supplied from the respective channels to a cavity formed in the former which is communicatively connected to the adapter so that the streams of molten resin introduced from the respective channels are developed into plate like bodies, merging the plate-like bodies in an overlapping state, heat-bonding the interlayer of the overlapping plate-like bodies.

DETAILED DESCRIPTION OF THE PREFERRED EMBODIMENTS

Preferred embodiments of the present invention will be described with reference to the drawings.

Figure 1:
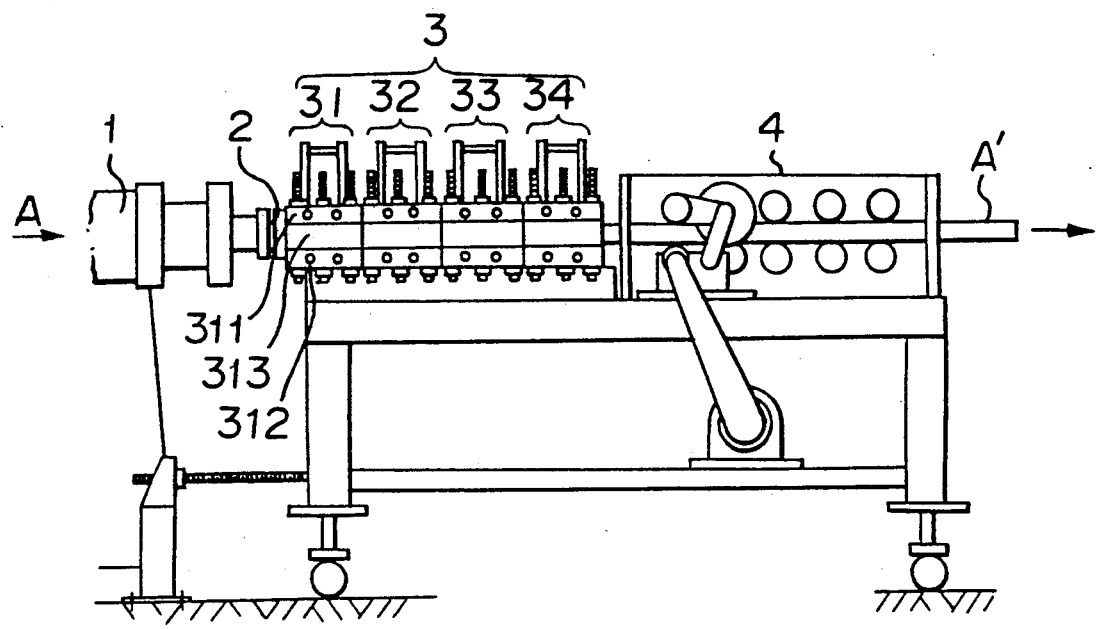
FIG. 1 is a front view of an extrusion apparatus used for carrying out a first embodiment of the method of the present invention.
Figure 2:
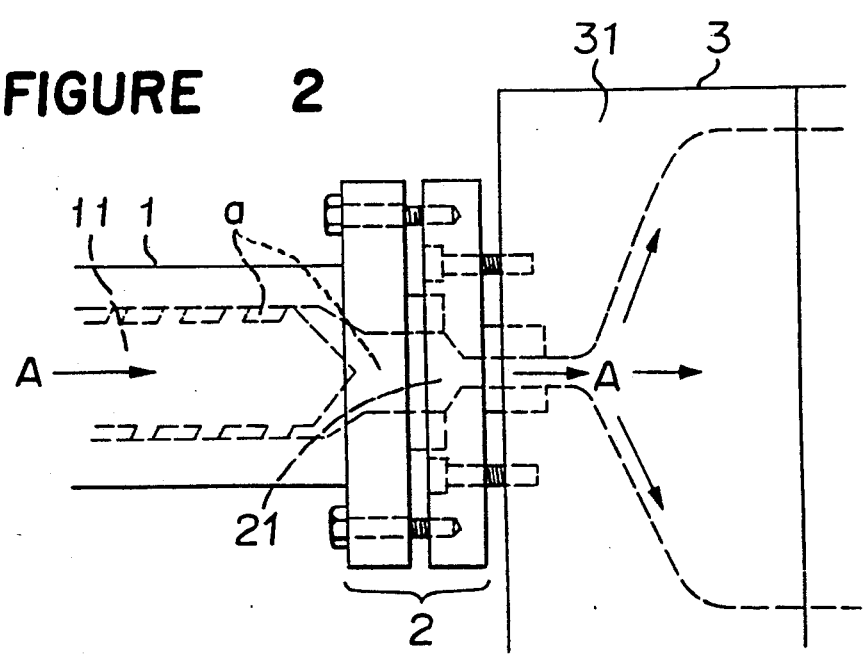
FIG. 2 is an enlarged plane view partly omitted of an introducing section connected to the extrusion apparatus as shown in FIG. 1.

As shown in FIGS. 1 and 2 which illustrate the extrusion apparatus used for carrying out the first embodiment of the method of the present invention, a molten filler-containing resin A is introduced from an extruder 1 to a channel 21 formed in an adapter 2. Then, the molten resin is fed to the first block 31 in a former 3 which is formed by arranging in series temperature-adjustable blocks each being capable of changing temperature in which the first block has a partitioned cavity where the molten resin is divided and developed into two plate-like bodies. In the former 3, each of the plate-like bodies are merged in an overlapping state under a back pressure which is given by the damping function of a take-up device 4, and the interlayer of the overlapping plate-like bodies is heat-bonded, and thereafter, the heat-bonded material is subjected to gradually cooling whereby a plastic plate is formed.

The former 3 comprises first-fourth temperature adjusting blocks 31-34 each having an upper metal mold 311, a lower metal mold 312 and side plates 313. Each of the blocks is assembled so as to be perpendicular to the direction of the extruding of the resin.

Between the extruder 1 and the take-up device 4, disposed are the adapter 2 in which the channel 21 for flowing the molten filler-containing resin A is formed and the former 3 for forming the molten filler-containing resin. A which has passed through the channel 21, whereby the molten filler-containing resin A is introduced into the first block 31 of the former 3 in the direction of an arrow mark.

Figure 5:
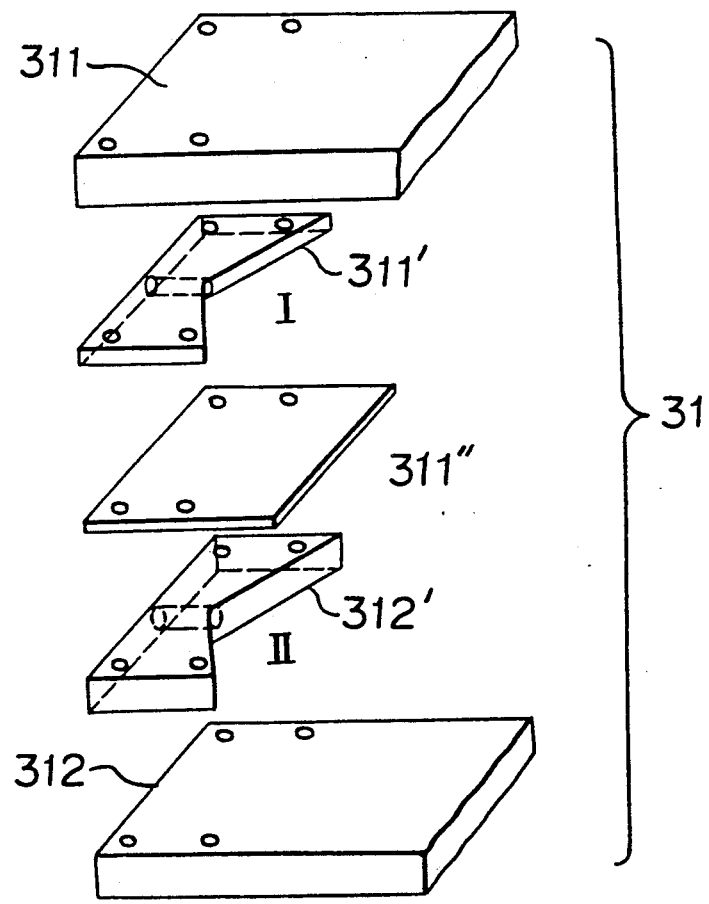
FIG. 5 is a perspective view in a disassembled state of the first block of a former in the extrusion apparatus as shown is FIGS. 1 and 3.

As shown in the disassembled perspective view of FIG. 5, the channel in the first block 31 is divided into upper and lower sections by providing a partition plate 311" in an intermediate portion between the upper metal mold 311 and the lower metal mold 312. Further, a resin developing plate 311' is interposed between the upper metal mold 311 and the partition plate 311" to form a cavity I, and a resin developing plate 312' is interposed between the lower metal mold 312 and the partition plate 311" to form a cavity II.

The molten filler-containing resin A introduced from the channel 21 to the first block 31 is divided and developed into two plate-like bodies in the cavities I and II respectively, and subsequently, the divided plate-like bodies are merged in an overlapping state. Then, they are melt-bonded at their interlayer to become a one-piece body under the application of a back pressure given by the damping function of the take-up device 4, and the one-piece body is gradually cooled while it is moved in the former 3 in the order of the second block 32, the third block 33 and the fourth block 34. Thus, a filler-containing plastic plate A' can be obtained.

Separate from the above-mentioned embodiment, there is obtainable a plastic plate formed by laminating in one piece three or more plate-like bodies wherein the extruder 1 is connected to the adapter 2 and molten filler-containing resin A is fed from the channel 21 in the adapter 2 into the cavity the interior of which is divided into three or more sections with use of two or more partition plates 311" whereby the molten resin A is divided and developed into three or more plate-like bodies.

The space between the upper metal mold 311 and the lower metal mold 312 of the first block 31 of the former was determined to be 32 mm, and two partition plates 311" of 1 mm thick were set at equidistance interposing resin developing plates therebetween. A filler-containing resin was prepared by mixing 40% by weight of talc as flaky filler with polypropylene. The resin was melt-extruded through the extruder 1 to form a plate-like molded product containing filler of 300 mm wide and 30 mm thick.

18 test pieces and 6 test pieces, each having a length of 300 mm, a width of 35 mm and a thickness of 30 mm, were sampled from the direction of the length and the width of the obtained plate-like molded product respectively. The bending modulus of each of the sampled test pieces was measured with an INTESCO tensile tester. As a result, it was confirmed that the bending modulus was improved by 15%-25% in the filler-containing plate-like molded product taken in the direction of the length and the width in comparison with a conventional product (i.e. a filler-containing plate-like molded product which was obtained without using the partition plate.

The improvement of the bending modulus is owing to the fact that the flaky talc particles are arranged in parallel to the surfaces of the plate-like molded product since the molten resin containing the talc particles flows subjecting to a shearing force by the partition plates 311" in the former 3. Accordingly, the bending modulus of the plate-like molded product can be improved in both the directions of the length and the width in comparison with the conventional plate-like molded product without having the parallel arrangement of the talc particles.

Figure 3:
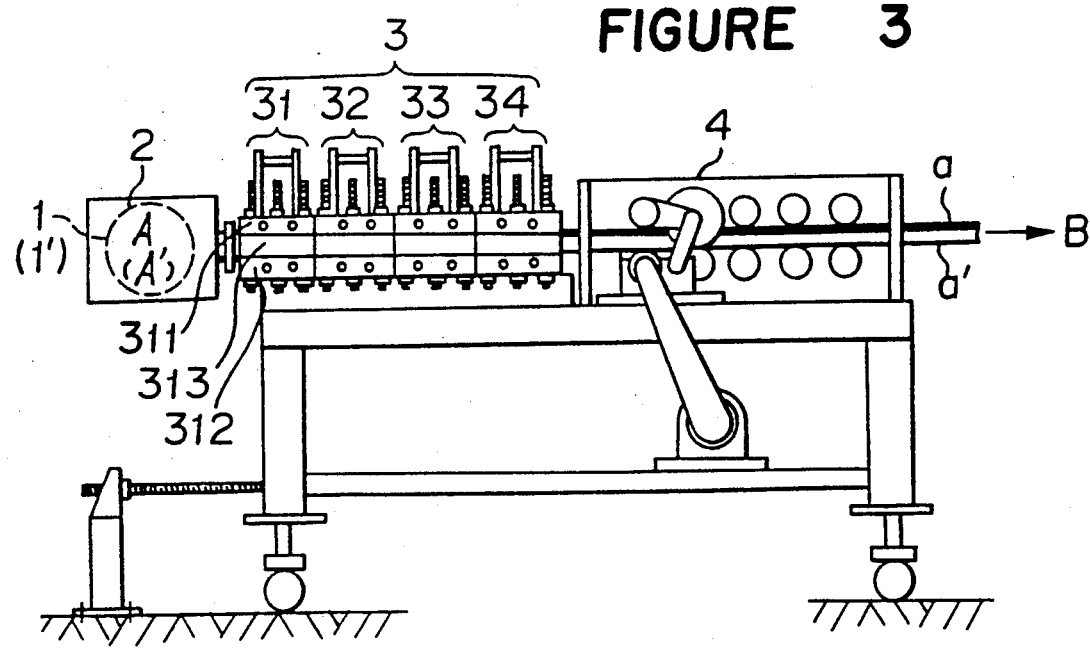
FIG. 3 is a front view of an extrusion apparatus used for carrying out a second embodiment of the method of the present invention.
Figure 4:
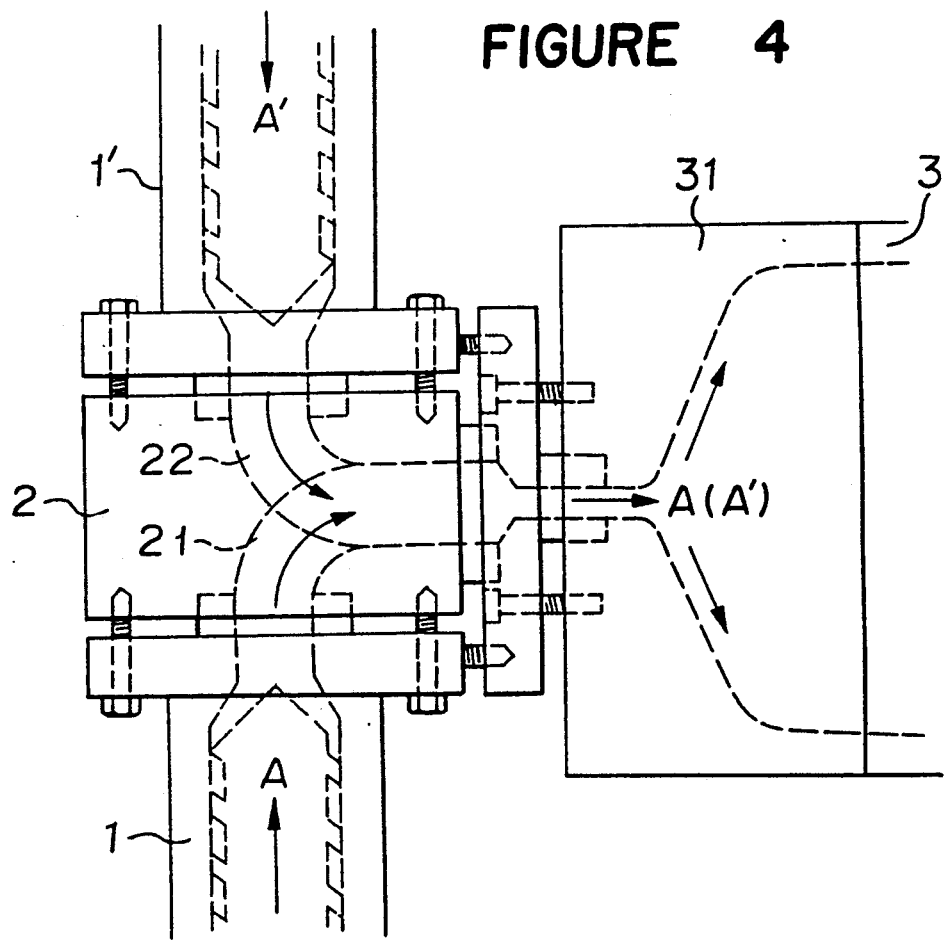
FIG. 4 is an enlarged plane view partly omitted of an introducing section connected to the extrusion apparatus as shown in FIG. 3.

FIGS. 3 and 4 show another embodiment of the method of forming a plastic plate according to the present invention. According to the second embodiment, a sole resin or filler-containing resins A, A' are respectively introduced in independent channels 21, 22 in a single adapter 2 from the respective extruders 1, 1''; the two streams of resin are caused to flow into the cavity formed in the first block 31 in the former 3 which is constituted by arranging in series a plurality of temperature adjusting blocks so that the two streams of resin are developed into plate-like bodies in the inner cavity portions I and II of the cavity which is partitioned by the partition plate 311" between the upper metal mold 311 and the lower metal mold 312 in the first block 31 as shown in FIG. 5; then, the developed plate-like bodies A, A'' are merged in an overlapping state; they are unified by heat at the interlayer under a back pressure given by the damping function of the taking-up device 4; the unified resin plate is gradually cooled while it is moved in the former 3 in the order of the second block 32, the third block 33 and the fourth block 34, whereby a plastic plate B consisting of upper and lower layers a, a' is obtainable.

Besides the above-mentioned embodiments, the present invention is applicable to obtaining a plastic plate having three or more layers wherein three or more extruders are connected to a single adapter; each molten resin stream is caused to flow through three or more independent channels formed in the adapter into the cavity of the former which is sectioned with two or more partition plates so that each of the molten resin streams is developed into a plate-like body; thus formed plate-like bodies are merged in an overlapping state followed by melt-bonding the interlayers of the overlapping plate-like bodies, whereby a plastic plate consisting of three or more layers can be obtained.

In any above-mentioned embodiment, orientation is imparted to the flake-like filler particles mixed in the plastic plate while the molten filler-containing resin passes through the first block 31 of the former during which the resin is extruded subjecting to a sharing force by the front and rear surfaces of the partition plate(s) 311".

In accordance with the present invention, the following effect can be obtained.

In accordance with the method of extruding molten resin mixed with flaky inorganic filler particles from an extruder through an adapter, the molten resin is developed into a plurality of plate-like bodies in a cavity with at least one partition plate, formed in a former, and the filler in the molten resin is subjected to a shearing force by the partition plate in the cavity and exhibits an orientation, whereby a plastic plate thus formed has a high rigidity over the entire layer.

Further, in accordance with the present invention, a plurality of kinds of resin each having different hue or different composition, are respectively melt-extruded by means of a plurality of extruders, and the plurality of resin streams are introduced into an adapter having a plurality of independent channels; thereafter, they are developed into plate-like bodies in a cavity, and then the developed plate-like bodies are overlapped to be unified. Accordingly, the above-mentioned method is very convenient when there is a demand that the front layer portion and the rear layer portion, or an intermediate layer and the front and rear layer portions have different kinds of hue or different kinds of composition. Further, when a filler-containing resin is used for a resin to be extruded, a plastic plate having a high rigidity and an excellent quality can be easily obtained.

In accordance with the present invention, the process of forming a plastic plate can have only a single step and a continuous production is allowed in comparison with a conventional method wherein a molten resin is extruded; the extruded resin to form a plate; a plurality of the plates are heated and compressed with rollers or a pressing machine followed by integration. Accordingly, the present invention is excellent in productivity, and products obtained by the present invention have a reduced heat history of the resin, and are excellent in appearance and quality.

We claim:

1. A method of forming a rigid plastic plate, comprising the steps of:

melt-extruding a thermoplastic resin containing a flake-like inorganic filler with an extruder into a former while applying a back pressure to the extruded thermoplastic resin to thereby form a plate-like body, wherein the molten resin extruded from the extruder is introduced into a channel formed in an adapter;

feeding the molten resin to a cavity having at least one partition plate, formed in the former which is communicatively connected to the adapter so that the molten resin introduced from the channel is divided and developed into at least two plate-like bodies;

merging the plate-like bodies in the former in an overlapping state; and heat-bonding an interlayer of the overlapping plate-like bodies in the former.

2. A method of forming a rigid plastic plate, comprising the steps of:

melt-extruding a thermoplastic resin with a plurality of extruders into a former while a back pressure is applied to the extruded thermoplastic resin, wherein the extruders are communicatively connected to a single adapter;

introducing a molten resin supplied from each of the extruders into channels formed independently in the adapter; feeding the molten resin supplied from the respective channels to a cavity formed in the former which is communicatively connected to the adapter so that the streams of molten resin introduced from the respective channels are developed into plate-like bodies;

merging the plate-like bodies in an overlapping state; and heat-bonding an interlayer of the overlapping plate-like bodies in the former.

3. The process of claim 1 including the step of cooling the bonded plate-like bodies in the former.

4. The process of claim 2 including the step of cooling the bonded plate-like bodies in the former.

* * * * *